United States Patent
Cao et al.

(10) Patent No.: US 6,398,102 B1
(45) Date of Patent: Jun. 4, 2002

(54) METHOD FOR PROVIDING AN ANALYTICAL SOLUTION FOR A THERMAL HISTORY OF A WELDING PROCESS

(75) Inventors: Zhenning Cao, Columbus; Jinmiao Zhang, Dublin; Frederick W. Brust, Columbus, all of OH (US); Ashok Nanjundan, Savoy; Yi Dong, Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/650,521

(22) Filed: Aug. 29, 2000

Related U.S. Application Data
(60) Provisional application No. 60/157,759, filed on Oct. 5, 1999.

(51) Int. Cl.[7] .............................................. B23K 31/12
(52) U.S. Cl. .................. 228/103; 148/503; 219/130.01
(58) Field of Search .................... 219/130.01; 228/103; 148/500, 503; 700/145

(56) References Cited

U.S. PATENT DOCUMENTS
4,475,963 A * 10/1984 Takahashi et al. .......... 148/503

FOREIGN PATENT DOCUMENTS
EP 0512972 A2 5/1992

OTHER PUBLICATIONS
A Heat–Flow Solution With Convective Boundaries, Dr. Cao, Dr. Brust, Dr. Dong, Battelle Memorial Institute.
"Finite element analysis of GMA (MIG) welded joints", Barberis et al., vol. 10, 1996.
"Surface Temperature Distribution of GTA Weld Pools on Thin–Plate 304 Stainless Steel", Zacharia et al. 11/1995.
"Finite element analysis of GMA (MIG) welded joints", Barberis et al., vol. 10, 1996.
"Surface Temperature Distribution of GTA Weld Pools on Thin–Plate 304 Stainless Steel", Zacharia et al. Nov. 1995.

\* cited by examiner

Primary Examiner—Clifford C. Shaw
(74) Attorney, Agent, or Firm—Steve D. Lundquist

(57) ABSTRACT

A method for providing an analytical solution for a thermal history of a welding process having multiple weld passes. The method includes the steps of inputting a plurality of files and parameters, preprocessing information from the plurality of files and parameters to determine a set of conditions associated with the welding process, determining a region of influence of at least one heat source used in the welding process as a function of the set of conditions, determining a plurality of point heat source solutions within the region of influence, determining a temperature solution for each weld pass as a function of a superposition of the plurality of point heat source solutions, and determining the thermal history of the welding process as a function of the temperature solutions.

6 Claims, 9 Drawing Sheets

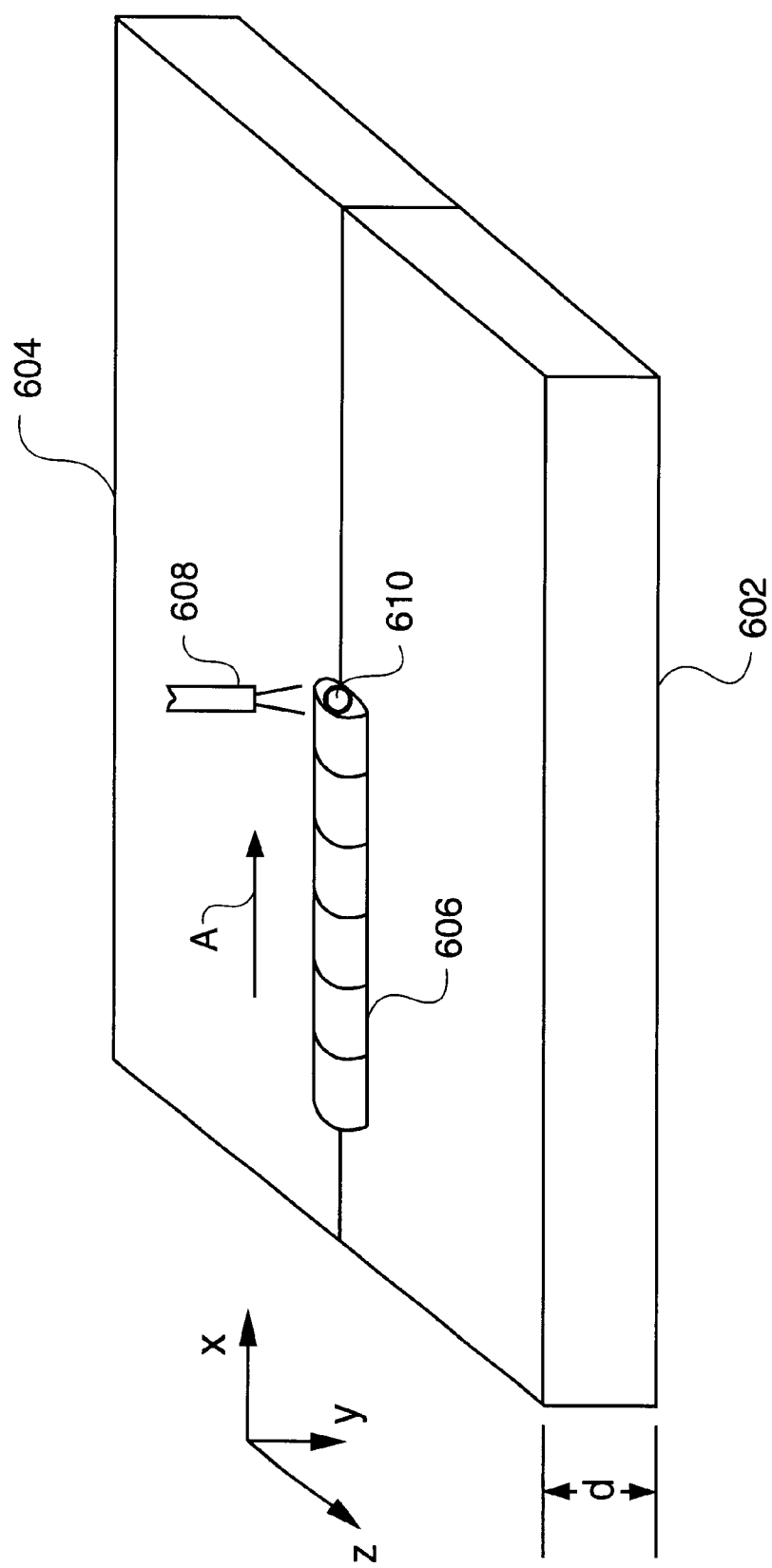

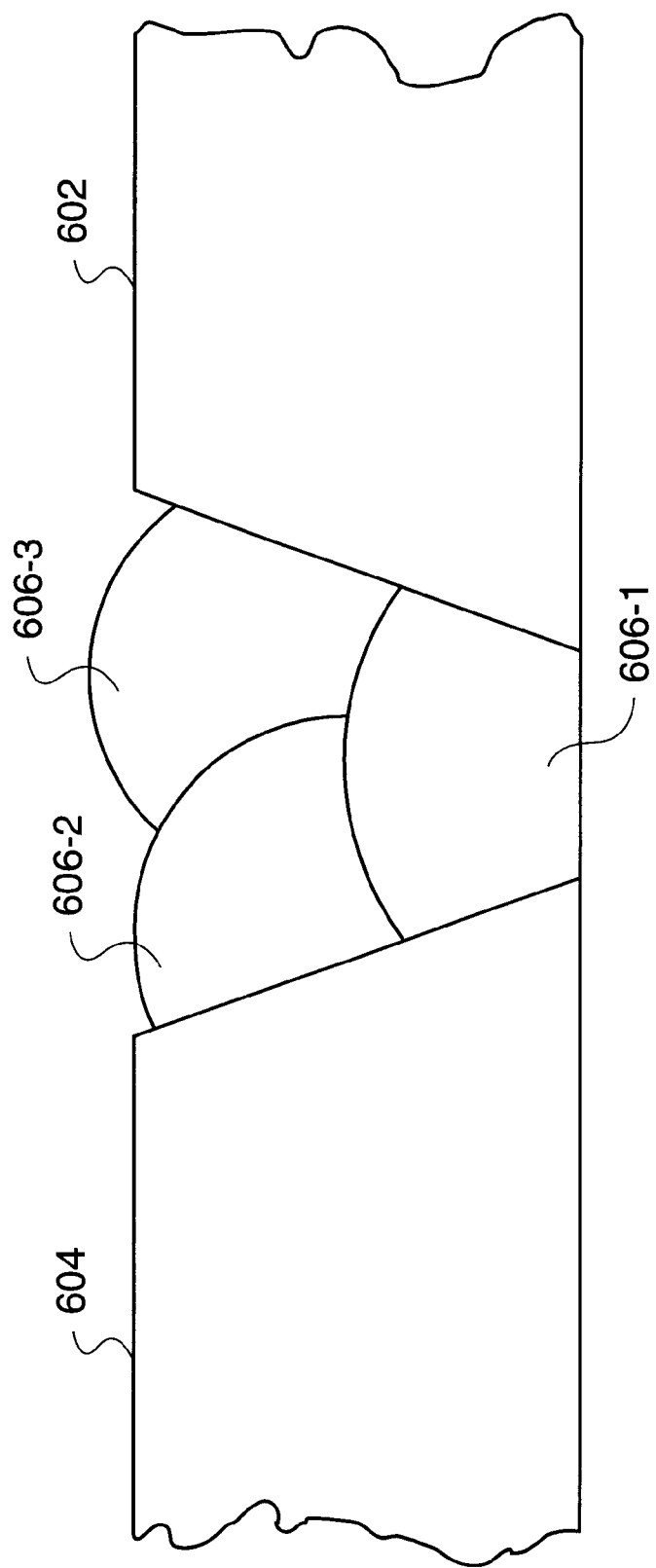

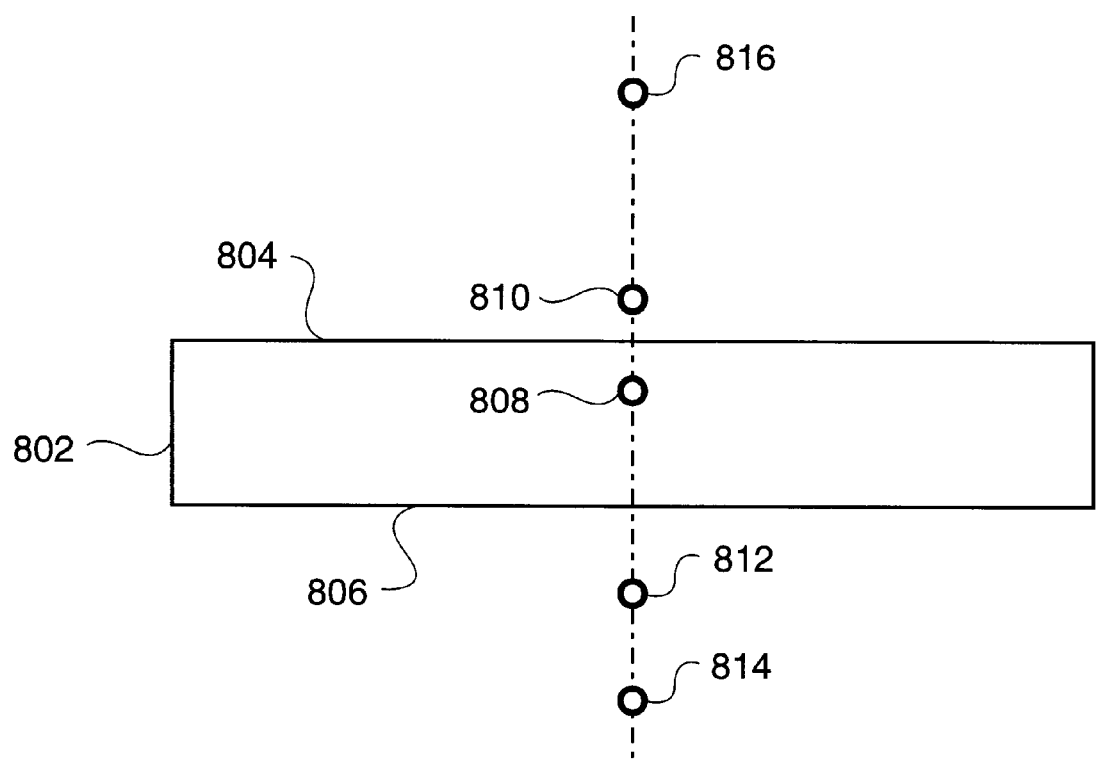

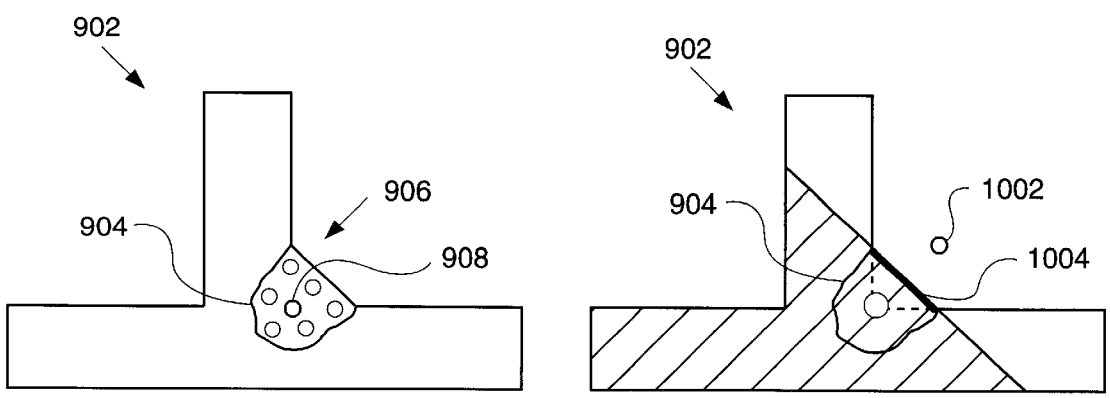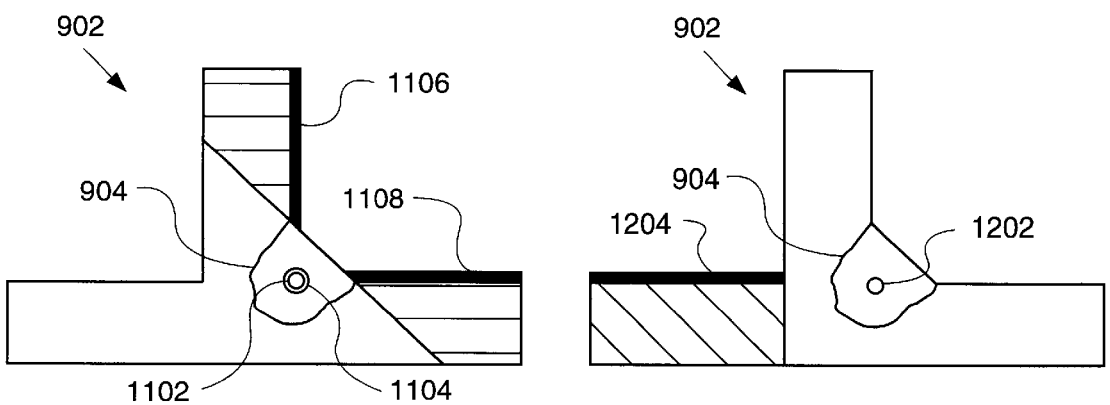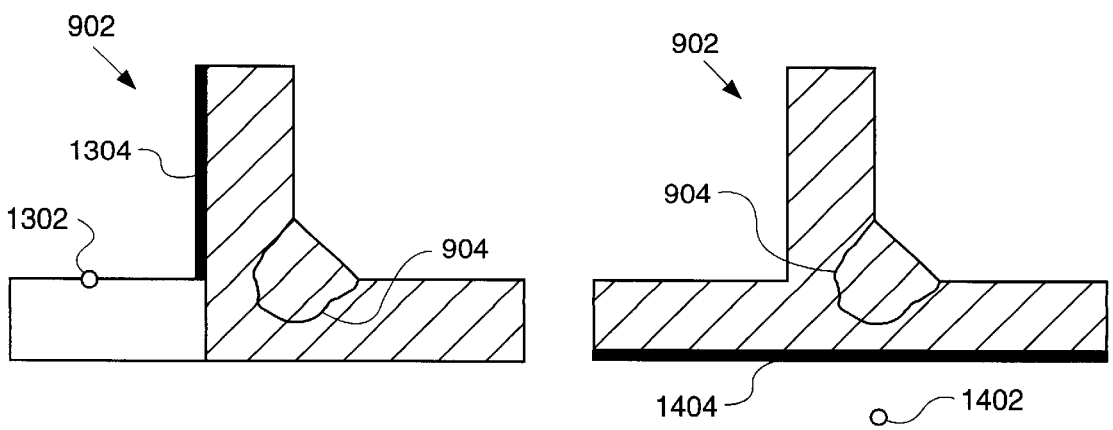

METHOD FOR PROVIDING AN ANALYTICAL SOLUTION FOR A THERMAL HISTORY OF A WELDING PROCESS

This application claims the benefit of prior provisional patent application Serial No. 60/157,759 filed Oct. 5, 1999.

TECHNICAL FIELD

This invention relates generally to a method for providing a solution for thermal modeling of a welding process and, more particularly, to a method for providing an analytical solution for determining a temperature history on a material that is subjected to a welding process.

BACKGROUND ART

The process of welding materials has some amount of detrimental effect on the materials being welded. For example, materials being welded are subjected to residual stresses and distortions due to the extreme heat caused by the weld process.

In the past, attempts have been made to analyze and determine the effects of heat on materials from the welding process. One method in particular, the finite element method (FEM), uses finite element analysis to model the weld process, and has been widely used to analyze the thermal effects of welding. However, FEM can be extremely cumbersome to implement and very costly.

Rosenthal, in *Mathematical Theory of Heat Distribution During Welding and Cutting,* Welding Journal, Vol. 21(5), pp. 220s–234s, discloses an analytical solution for the thermal history of a welding process which works by the superposition of point heat source solutions. The method proposed by Rosenthal did not require the extremely cumbersome finite element analysis techniques previously used, and therefore provided a much more rapid analytical solution procedure. However, the method of Rosenthal's does not account for such features as weld joint geometry and multi-pass welding. Furthermore, it may be desired to use both types of thermal models for some applications. For example, an analytical based model may be used for providing rapid, global solutions, and the FEM may be used to provide accurate temperature models for local areas of concern.

The present invention is directed to overcoming one or more of the problems as set forth above.

DISCLOSURE OF THE INVENTION

In one aspect of the present invention a method for providing an analytical solution for a thermal history of a welding process having multiple weld passes is disclosed. The method includes the steps of inputting a plurality of files and parameters, preprocessing information from the plurality of files and parameters to determine a set of conditions associated with the welding process, determining a region of influence of at least one heat source used in the welding process as a function of the set of conditions, determining a plurality of point heat source solutions within the region of influence, determining a temperature solution for each weld pass as a function of a superposition of the plurality of point heat source solutions, and determining the thermal history of the welding process as a function of the temperature solutions.

BRIEF DESCRIPTION OF THE DRAWINGS

FIG. 6 is a diagrammatic illustration of two pieces of material being welded together;

FIG. 7 is a diagrammatic illustration of a cross section portion of FIG. 6;

FIG. 8 is a diagrammatic illustration of original and reflected heat sources about a portion of finite thickness material;

FIG. 9 is a diagrammatic illustration of a T-fillet weld joint with an original heat source;

FIG. 10 is a diagrammatic illustration of a T-fillet weld joint with a first reflected heat source;

FIG. 11 is a diagrammatic illustration of a T-fillet weld joint with second and third reflected heat sources;

FIG. 12 is a diagrammatic illustration of a T-fillet weld joint with a fourth reflected heat source;

FIG. 13 is a diagrammatic illustration of a T-fillet weld joint with a fifth reflected heat source; and FIG. 14 is a diagrammatic illustration of a T-fillet weld joint with a sixth reflected heat source.

BEST MODE FOR CARRYING OUT THE INVENTION

Figure 1:
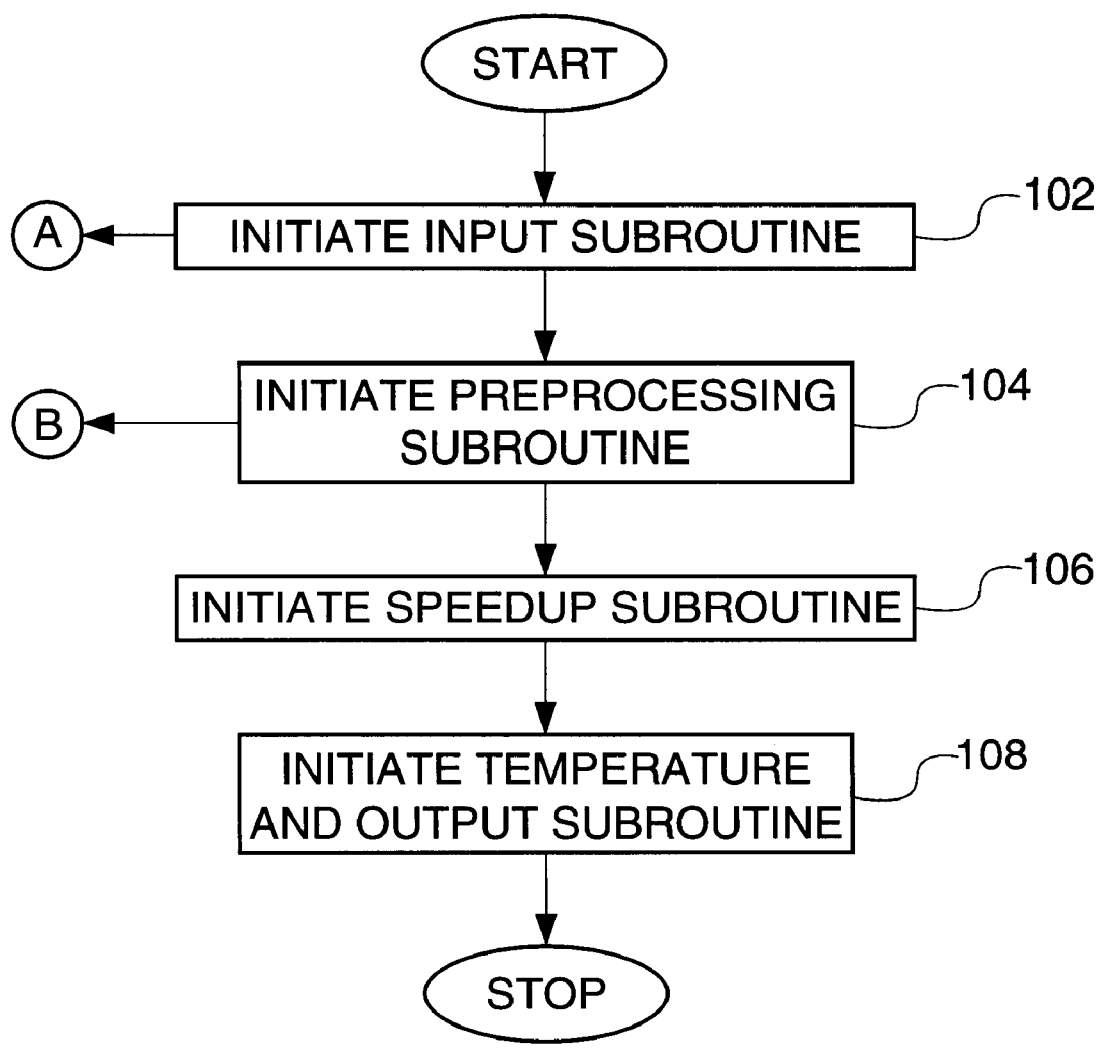
FIG. 1 is a flow diagram illustrating a preferred method of the present invention.

With reference to the accompanying figures, a method for providing an analytical solution for a thermal history of a welding process is disclosed. The method has particular application for weld processes having multiple weld passes, in which the thermal histories of each weld pass must be incorporated into the total weld history to accurately reflect the thermal effects of the weld process on the material being welded.

In addition, the method is suited for use with weld operations involving complex geometric weld configurations. For example, lap joints, v joints, T-fillet joints, and the like would involve complex thermal modeling due to the various geometric joint shapes. The present invention is adapted to include geometric configurations in the thermal models.

Referring to FIG. 6, a diagrammatic illustration of two pieces of material, i.e., a first piece of material 602 and a second piece of material 604, are shown. The first and second pieces of material 602,604 have a thickness d and are being welded together in a standard butt joint weld formation. However, any type of weld formation could just as well be illustrated in FIG. 6. The butt joint of FIG. 6 readily illustrates the weld process for purposes of explanation.

A weld 606 is being deposited between the first and second pieces of material 602,604, thus rigidly connecting them together. The weld 606 is applied by a heat source 608, preferably a welder such as an arc welder. The heat source 608 creates a heat center 610, which serves to melt the weld 606 as the heat source 608 moves along the weld path in the direction of arrow A, which is shown as the direction of the x axis in an x,y,z coordinate system. As the heat source 608 moves, the portion of the weld 606 previously melted cools, either naturally or by application of a coolant, and hardens, thus forming a bond between the first and second pieces of material 602,604.

Referring to FIG. 7, a diagrammatic illustration of a cross section of a portion of the first and second pieces of material 602,604 are shown. As illustrated in FIG. 7, the first and second pieces of material 602,604 are butted together and form a groove where they meet. The weld 606 is shown applied in three passes, i.e., a first pass of the weld 606-1, a second pass of the weld 606-2, and a third pass of the weld 606-3. Each pass of the weld 606-1,606-2,606-3 fills a portion of the groove until the weld process is completed and the groove preferably is filled.

Referring to FIG. 1, a flow diagram of a preferred method of the present invention is shown. The flow diagram of FIG. 1 illustrates an overview of the method. Reference is made to additional flow diagrams, i.e., subroutines of the flow diagram of FIG. 1, as needed.

In a first control block 102, a subroutine for inputting information is initiated. The information includes, but is not limited to, a finite element mesh of the materials to be welded, welding parameters, thermo-physical properties of the materials to be welded, weld joint information, and weld joint geometry. The first control block 102 of FIG. 1 is described in more detail with reference to FIG. 2.

Figure 2:
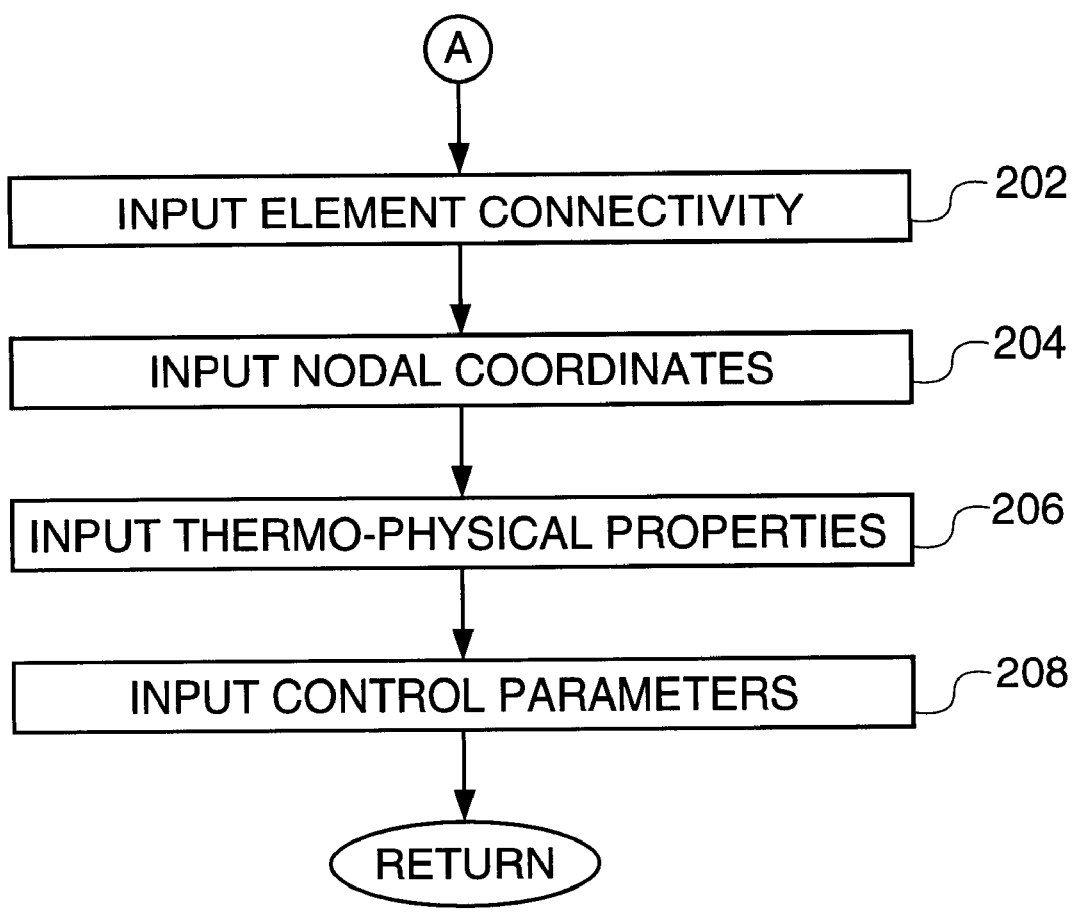
FIG. 2 is a flow diagram illustrating one aspect of the present invention.

In FIG. 2, in a first control block 202 element connectivity information of the finite element mesh is input. Finite element analysis is well known in the art and will not be discussed in great detail. However, it is noted that one element consists of four nodes; that is, nodes 1,2,3,4 form element 1 for example.

In a second control block 204, nodal coordinates are input. In the preferred embodiment, each node is given a coordinate in a local coordinate system, such as a Cartesian, or x,y,z coordinate system. From this information, the location of all nodes and elements are known in x,y,z coordinates. The node and element information also includes information about the joint geometry being used.

In a third control block 206, thermo-physical properties of the materials to be welded are input. Such properties may include, but are not limited to, conductivity of the materials, specific heat of the materials, and density of the materials.

In a fourth control block 208, various control parameters are input. The control parameters are relevant to the different types of weld joints being used, and may include such information as the placement of the heat source relative to the materials being welded, and the like.

Referring back to FIG. 1, in a second control block 104, a preprocessing subroutine is initiated. Preferably, the preprocessing subroutine inputs information which is specifically related to the weld process. A flow diagram of the preprocessing subroutine is shown in FIG. 3.

Figure 3:
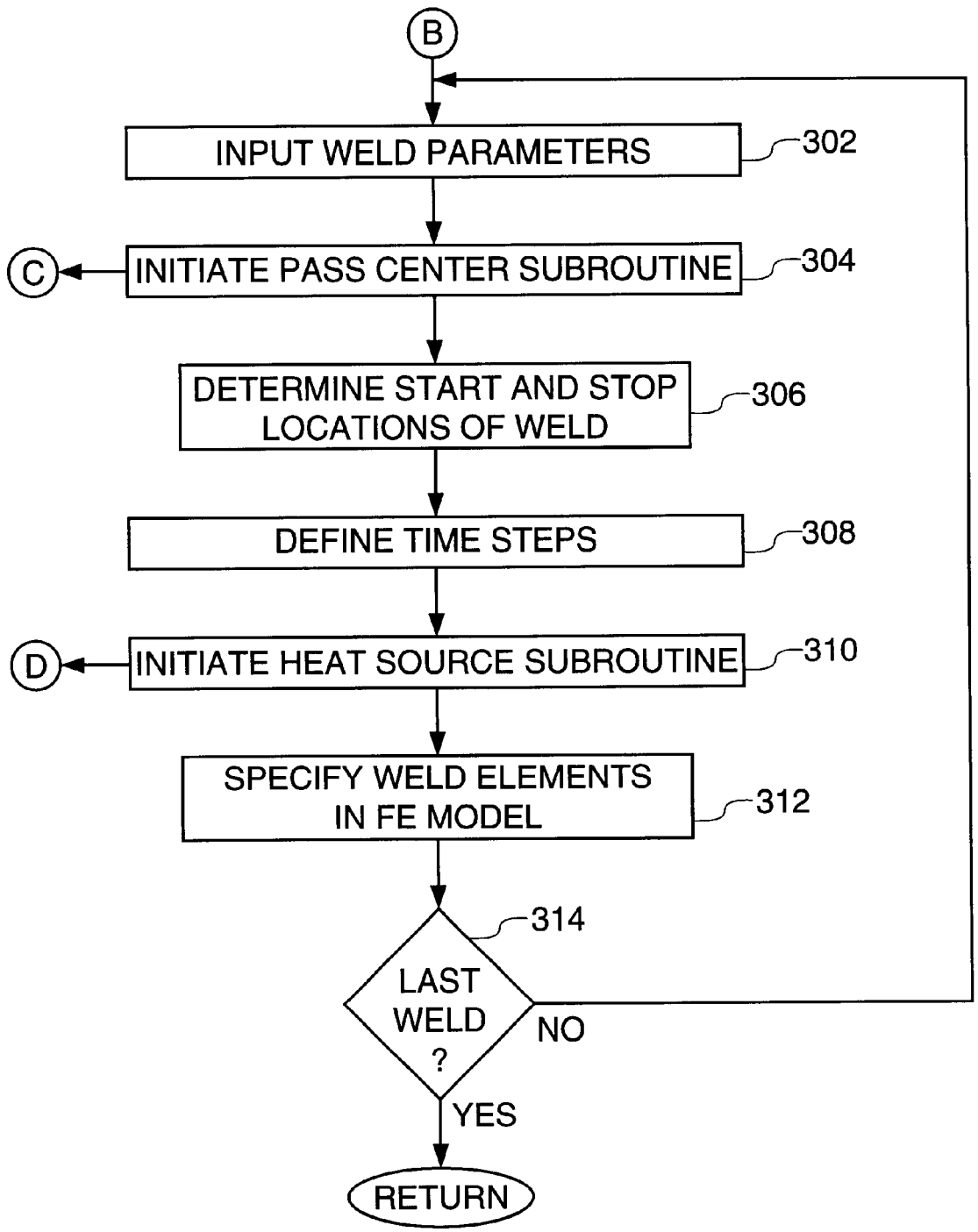
FIG. 3 is a flow diagram illustrating another aspect of the present invention.

Referring to FIG. 3, in a first control block 302, weld parameters are input. The weld parameters may include, but are not limited to, voltage and current provided to the weld heat source, e.g., for an arc welder, the travel speed of the heat source as it welds, and other parameters associated with the weld process.

In a second control block 304, a pass center subroutine is initiated. The pass center subroutine is used to determine the center of the weld pass as the heat source moves, and is described in more detail with reference to FIG. 4.

Figure 4:
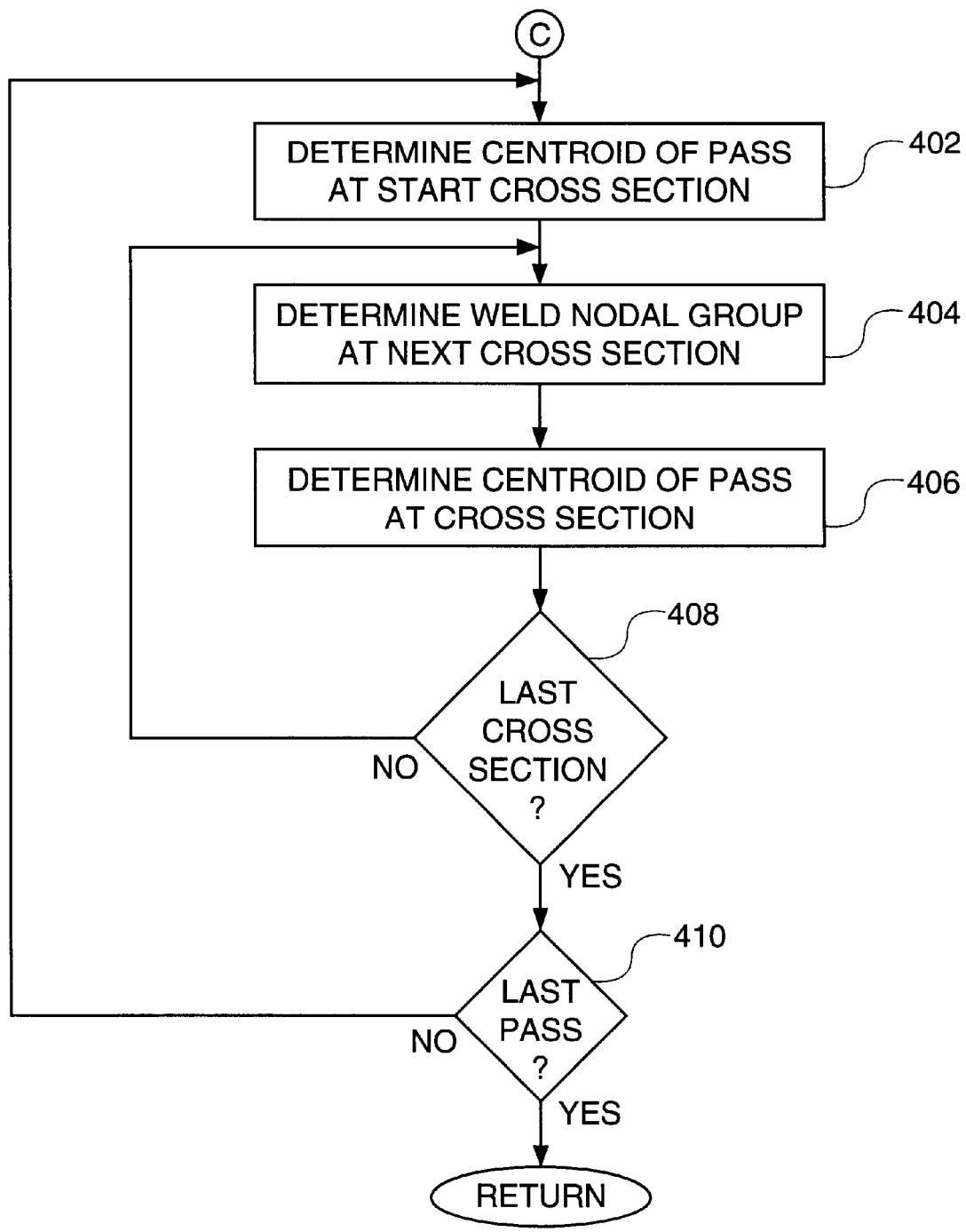
FIG. 4 is a flow diagram illustrating yet another aspect of the present invention.

Referring to FIG. 4, in a first control block 402, a centroid of the pass at a start cross section is determined. For example, in FIG. 9, a centroid 908 is shown for a T-fillet weld joint 902. Preferably, the centroid of the pass is determined with respect to the coordinates of the elements and nodes of the finite element mesh.

In a second control block 404, the weld nodal group at the next cross section is determined. The procedure is analogous to slicing the weld 606 depicted in FIG. 6 into thin cross sections, preferably at intervals no greater than the distances between nodes in the finite element mesh.

In a third control block 406, the centroid of the weld pass at each cross section is determined. The centroids may then be connected together to form a line, which is the centroid of the entire weld pass.

In a first decision block 408, a determination is made whether the centroid for the last cross section has been determined. If no, then the process loops to determine the next cross section and the centroid at the next cross section. If yes, then control proceeds to a second decision block 410, where it is determined if the last pass has been made. If no, then the centroid of the next pass at the start cross section is determined, and the process repeats for the next pass. If yes, then the process is complete, and control returns to the flow diagram of FIG. 3.

Returning to FIG. 3, in a third control block 306, the start and stop locations of the weld are determined, preferably in local x,y,z, coordinates.

In a fourth control block 308, a set of time steps are determined. In the preferred embodiment, the time steps are used to break time down into finite elements, which are then used to define heating and cooling cycles of the weld. For example, a heating cycle may be 10 seconds and a cooling cycle may be 2000 seconds. The increments of the time steps are preferably no larger then the time needed for the weld process to move from one node to another. The time steps add a fourth dimension to the x,y,z dimensions of the finite element mesh.

In a fifth control block 310, a heat source subroutine is initiated. The heat source subroutine is described in more detail with reference to FIG. 5.

Figure 5:
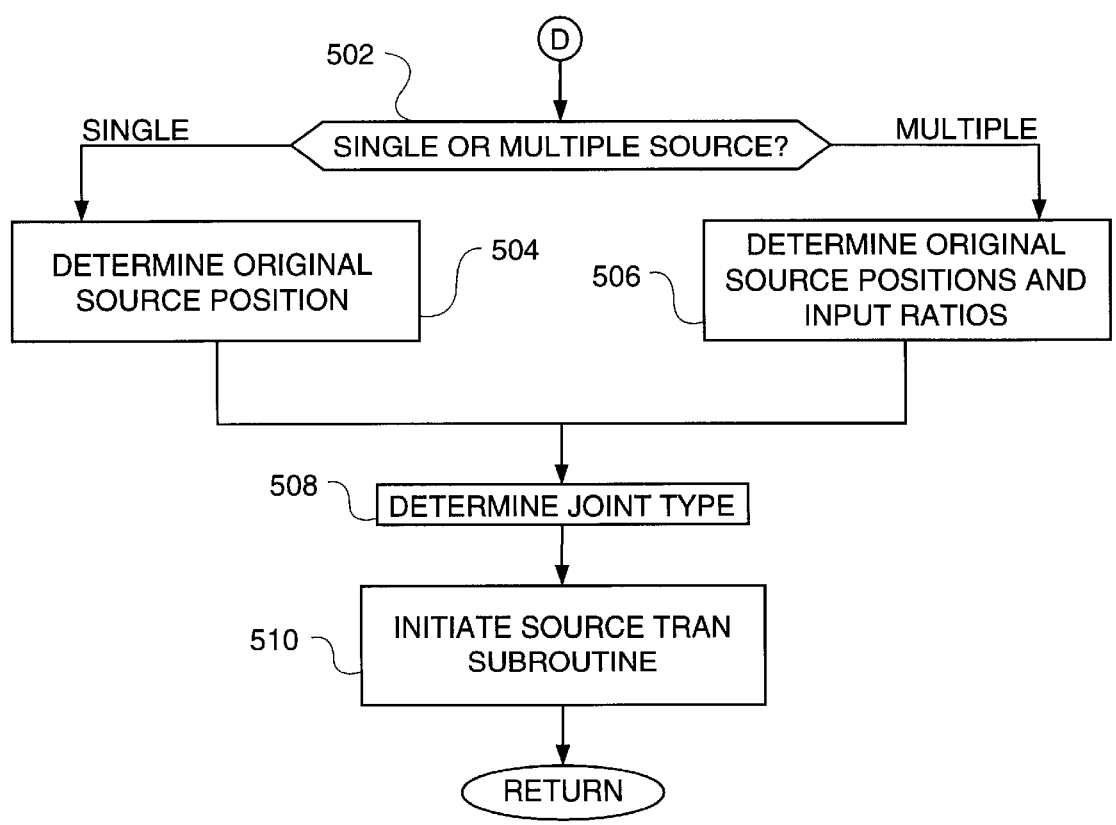
FIG. 5 is a flow diagram illustrating still another aspect of the present invention.

Referring to FIG. 5, in a first decision block 502, it is determined if a single heat source or multiple heat sources exist. If only one heat source exists, control proceeds to a first control block 504. In the first control block 504, the position of the original heat source is determined, preferably in local x,y,z coordinates. In the preferred embodiment, the original heat source is determined to be at the center of the weld pass, i.e., at the centroid.

Referring to FIG. 8, a bar of finite thickness material 802 is shown. The material 802 has a top surface 804 and a bottom surface 806. An original heat source 808 is shown within the material 802. The original heat source 808 is shown at a position which represents the centroid of a weld pass for two materials welded together in a manner such as illustrated in FIGS. 6 and 7.

A series of reflected heat sources may be determined to exist at positions determined by mirrored reflections of the original heat source 808. The theory of reflected heat sources for a material is well known in the art and will not be discussed further. As shown in FIG. 8, there is a first reflected heat source 810 of the original heat source 808 for the top surface 804. There is also a second reflected heat source 812 of the original heat source 808 for the bottom surface 806. In addition, there is shown a third reflected heat source 814 of the first reflected heat source 810 for the bottom surface, and a fourth reflected heat source 816 of the second reflected heat source 812 for the top surface. In theory, the reflected heat sources may continue infinitely. However, in practice, only a limited number of reflected heat sources need be determined.

It is well known in the art that a solution for the thermal history of a material may be determined by the superposition of the above determined heat sources. For example, Rosenthal, in *Mathematical Theory of Heat Distribution During Welding and Cutting,* Welding Journal, Vol. 21(5), pp. 220s–234s, discloses an analytical solution for the thermal history of a welding process which works by the superposition of point heat source solutions.

Referring back to the first decision block 502 of FIG. 5, if it is determined that multiple heat sources exist, control proceeds to a second control block 506. In the second control block 506, the original heat source positions and a set of input ratios are determined. This is described in more detail with reference to FIGS. 9–14.

Referring to FIGS. 9–14, and in particular to FIG. 9, a T-fillet weld joint type 902 is shown. The T-fillet weld joint type is exemplary for the purpose of illustrating the determination of original and reflected weld heat sources. It is understood that the present invention is adapted to determine heat sources for a variety of weld joint geometric shapes. A weld 904 for the T-fillet joint type 902 is shown. The weld 904 is determined to have multiple original heat sources, i.e., seven heat sources 906 located throughout the weld 904. For practical purposes, however, the seven heat sources 906 may be solved by superposition to determine one effective original heat source at the centroid 908 of the weld 904. Each original heat source 906 is determined to carry a percent of heat, the total of the percents of heat of the seven heat sources 906 being 100 percent. Each of the seven heat sources 906 is determined to have an input ratio as a function of the percent of heat of each heat source 906.

In FIG. 10, a first reflected heat source 1002 of the original heat sources 906 is determined for a first surface 1004.

In FIG. 11, second and third reflected heat sources 1102, 1104 of the original heat source 906 are determined for second and third surfaces 1106,1108.

In FIG. 12, a fourth reflected heat source 1202 of the original heat source 906 is determined for a fourth surface 1204.

In FIG. 13, a fifth reflected heat source 1302 of the original heat source 906 is determined for a fifth surface 1304.

In FIG. 14, a sixth reflected heat source 1402 of the original heat source 906 is determined for a sixth surface 1404.

The original and reflected heat sources 906,1002,1102, 1104,1202,1302,1402 are then used to determine the thermal history of the weld 904 by the superposition principles described above.

Referring back to FIG. 5, in a third control block 508, the joint type is determined. For example, as described above, the joint type may be a T-fillet joint, lap joint, v joint, butt joint, or any of a number of possible joint types.

In a fourth control block 510, a source tran subroutine is initiated. The source tran subroutine is used to transform all local coordinate systems, e.g., elements, nodes, heat sources, and the like, to a global coordinate system, preferably an x,y,z coordinate system. Control then returns to the flow diagram of FIG. 3.

Referring back to FIG. 3, in a sixth control block 312, all of the weld elements in the finite element model, for all weld passes, are specified. For example, the centroids, heat sources, and the like are specified for use in further analysis of the weld process.

In a first decision block 314, it is determined whether the last weld has been performed. If no, then control loops to the first control block 302, where the process is repeated. If yes, then control returns to the flow diagram of FIG. 1.

Referring back to FIG. 1, in a third control block 106, a speedup subroutine is initiated. The speedup subroutine is used to reduce computational time required to perform a thermal history analysis of the weld process. In the preferred embodiment, the speedup subroutine calculates a region of influence of the set of heat sources used for each weld process. As a result, the thermal solution is accomplished more quickly since the solution for only the region of influence is calculated, and solutions for areas outside the region of influence are ignored. The region of influence may be position based; that is, only the geographic area affected by the weld process is analyzed. In addition, or alternatively, the region of influence may be time based; that is, the thermal history for an area is determined only for the time period in which the temperature within that area is above a predetermined threshold.

In a fourth control block 108, a temperature and output subroutine is initiated. Preferably, the temperature and output subroutine calculates the temperature solution based on the superposition of the heat source solutions, as described above. The temperature solution is output at each node in the region of influence at each time step to establish a thermal history of the weld process.

INDUSTRIAL APPLICABILITY

As an example of an application of the present invention, the thermal history of a weld process having multiple weld passes for a joint type having a complex geometry may be determined. The thermal history may be used for the analysis and prediction of welding induced distortions, residual stresses, and microstructure evolution of the material that has been welded. The thermal history may be determined during normal weld process applications, and the information may be used to analyze the weld process on the material in a nondestructive manner.

Other aspects, objects, and features of the present invention can be obtained from a study of the drawings, the disclosure, and the appended claims.

What is claimed is:

1. A computer based method for providing an analytical solution for a thermal history of a welding process having multiple weld passes, including the steps of:

inputting a plurality of files and parameters;

preprocessing information from the plurality of files and parameters to determine a set of conditions associated with the welding process;

determining a region of influence of at least one heat source used in the welding process as a function of the set of conditions;

determining a plurality of point heat source solutions within the region of influence;

determining a temperature solution for each weld pass as a function of a superposition of the plurality of point heat source solutions; and determining the thermal history of the welding process as a function of the temperature solutions.

2. A method, as set forth in claim 1, wherein inputting a plurality of parameters includes the step of inputting a weld joint geometry of a material being welded in the welding process.

3. A method, as set forth in claim 2, wherein inputting a plurality of files and parameters includes the steps of:

inputting a plurality of elements and nodes of a finite element mesh of a material being welded in the welding process;

assigning a coordinate for each node of the finite element mesh;

inputting a plurality of thermo-physical properties of the material being welded; and inputting a plurality of control parameters, the control parameters being a function of the weld joint geometry of the material being welded.

4. A method, as set forth in claim 3, wherein preprocessing information from the plurality of files and parameters includes the steps of:

inputting a plurality of parameters of the welding process;

determining a center of a weld pass during the welding process;

determining a set of start and stop locations of the weld pass;

determining a set of time steps of the weld pass;

initiating a heat source subroutine for the welding process; and specifying a plurality of weld elements in the finite element mesh for the welding process.

5. A method, as set forth in claim 4, wherein determining a center of a weld pass includes the steps of:

determining a centroid of the weld pass at the start location of the weld pass;

determining a weld nodal group for each of a plurality of cross sections of the weld pass; and determining a centroid of the weld pass at each cross section.

6. A method, as set forth in claim 4, wherein initiating a heat source subroutine includes the steps of:

determining the heat source as being one of a singular and a multiple heat source;

determining the position of the heat source in response to determining the heat source as being a singular heat source;

determining the positions of each heat source and determining a set of input ratios of the heat sources in response to determining the heat source as being a multiple heat source; and determining a joint type of the material being welded, the joint type being a function of the weld joint geometry.

* * * * *